July 12, 1949.    G. W. HARVEY    2,475,834
FLEXIBLE PIPE JOINT
Filed May 5, 1945

INVENTOR.
GEORGE W. HARVEY
BY
ATTORNEY

Patented July 12, 1949

2,475,834

UNITED STATES PATENT OFFICE 2,475,834

FLEXIBLE PIPE JOINT

George W. Harvey, Glenburn, Calif., assignor to Solar Aircraft Company, San Diego, Calif., a corporation of California Application May 5, 1945, Serial No. 592,127

1 Claim. (Cl. 285—91)

This invention relates to flexible pipe joints of the ball and socket type and is particularly useful in exhaust lines for internal combustion engines which are exposed to corrosive gas at high temperatures.

An object of the invention is to provide a ball and socket joint of practical construction that is durable and reliable in service.

Another object is to provide a ball and socket joint in which the portion of the socket that seals with the ball can be made of a suitable material different from the rest of the assembly.

Another object is to provide a ball and socket joint in which the part of the socket that bears against the ball can be replaced.

Another object is to provide a ball and socket construction of such design that the part of the socket that seals against the ball can be made relatively thick.

Still another object is to provide a practicable ball and socket joint which can be readily assembled and disassembled.

It has been the practice heretofore in constructing ball and socket joints of types used in the exhaust lines of internal combustion engines to construct the socket portion that bears against the ball integral with the conduit section that leads away from the socket. This has limited designers in the selection of suitable materials and suitable thicknesses of the materials that contact the ball. Thus it is customary in the fabrication of exhaust manifold parts for use on aircraft to make the entire socket of thin sheet stainless steel or other alloy capable of resisting high temperatures and corrosion. Sometimes these thin sheet metal sockets were employed with sheet ball members of similar material or with relatively thick walled ball members of a material such as cast iron. In some instances, both the ball and socket have been formed of thin alloy sheet material having the same composition, but one or both of the members having a plating of some different metallic material such as chromium. Special packing rings or packing materials have sometimes been employed between the ball and socket to reduce leakage.

All of these prior structures have the disadvantage that they do not lend themselves to the use of relatively thick socket walls or to the use of special bearing materials in the socket for contacting the ball. Socket members consisting solely of a thin sheet metal wall also have the disadvantage that they must be shaped to enfold the ball after being mounted on the ball. This not only makes it more difficult to obtain a desired shape of the socket surface that contacts the ball, but makes it difficult to remove the socket from the ball if replacement becomes necessary.

In accordance with the present invention, I form the socket in two or more pieces and form the portion of the socket that bears against the ball of materials better adapted to permanently seal with the ball than are the materials suitable for forming the remainder of the socket element. My construction permits the use of ball-engaging members of any desired thickness and constructed of materials that are best suited for effecting a seal with the ball over a long period of time. My construction also enables the ready assembly and disassembly of the socket to replace the ball contacting portions thereof.

The manner in which I achieve the aforelisted objects of the invention, together with more specific objects and features thereof will become apparent from the following detailed description to follow with reference to the drawing of certain preferred embodiments of the invention.

Figure 1:
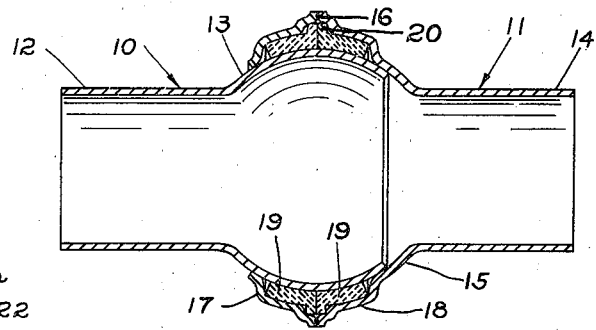
Fig. 1 is a longitudinal section through one embodiment of ball and socket joint in accordance with the invention.

Referring first to Fig. 1, there is shown a ball and socket joint comprising a ball member 10 and a socket member 11. The ball member 10 consists of a tubular section 12 formed integrally with a ball section 13. The socket member 11 consists of a tubular section 14 formed integrally with a bell section 15 which has joined thereto, as by welding 16, a collar section 17. The outer portion 18 of the bell section 15 and the collar 17 are of substantially larger diameter than the ball section 13 and serve to hold a pair of annular sealing elements 19 against the outer surface of the ball 13.

The annular sealing elements 19 may be identical, each having an inner surface that is spherical to fit concentrically against the ball 13 and having spherical outer surfaces adapted to rest against the enlarged portion 12 of the bell end on the socket and against the collar 17. The sealing elements 19 are also preferably provided with outwardly extending flanges 20 at their abutting edges, which flanges are received in an annular recess formed between the bell end of the member 11 and the collar 17 adjacent the weld line 16 therebetween.

The joint described is assembled by first positioning the sealing elements 19 on the ball 13 and thereafter assembling the socket member 11 and the collar element 17 together and welding them.

It will be observed that the sealing elements 19 are held together in compression so that they may be formed of a material that is relatively weak in tension. This permits the use of materials relatively weak in tension but otherwise well suited to form a good bearing surface with the ball 13 and effect a seal over a long period of time. Some materials that are suitable are ceramics which are cheap, withstand high temperatures while maintaining their initial hardness and may have wearing surfaces impregnated with talc or copper or electroplated with some material such as hard chromium. Ceramic materials having a wide range of coefficients of expansion are available so that a material can be selected that will give a very tight joint with the ball 13 at any desired working temperature.

It has been found that, in general, when the socket member of a ball and socket joint is thicker than the ball member, the ball member expands to a greater extent than the socket when the joint is conducting hot gases. Hence, it is sometimes desirable to fit the relatively thick sealing elements 19 rather loosely on the ball 13 when the assembly is cold, the ball member 13 expanding to reduce the clearance to a desired smaller value at the normal working temperature. Such construction insures that there will be ample clearance between the ball and socket to prevent binding before the joint heats up in service, while providing for a desirable closer clearance during normal operating conditions at an elevated temperature.

Materials other than ceramics are also well adapted for use in the sealing elements 19. Thus cast iron may be desirable under certain conditions. Under other conditions of more severe service, materials such as Stellite or cobalt may be used. The construction of the sealing elements separate from the rest of the socket member as described also permits the use of such materials as sintered carbides of tantalum, tungsten and the like which remain hard at elevated temperatures and have coefficients of expansion which can be utilized to give a tight joint at a desired high temperature by suitably proportioning the thickness of the elements and the clearance when the structure is cold.

Figure 2:
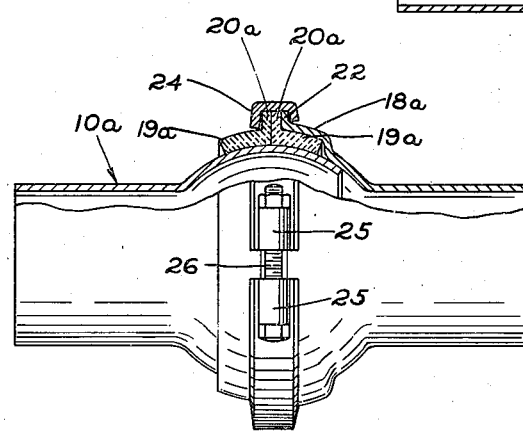
Fig. 2 is a side elevation partly in section showing a modification of the structure of Fig. 1.

Referring to Fig. 2, there is shown a joint having a ball member 10a similar in all respects to the ball member 10 of Fig. 1 and having sealing elements 19a substantially identical with the sealing elements 19 of Fig. 1, but having a socket construction that is somewhat different from that of Fig. 1 in other respects.

Thus, the end of the bell end 12a of the socket is bent outwardly to form a flange 22 which lies alongside the flange 20a of one of the annular sealing elements 19a, and the two flanges 20a—23a of the annular sealing elements and the flange 22 of the socket are detachably secured together by an annular channel-shaped clamp 24. Thus the ends of the clamp may have tubular eyes 25 welded thereto, which eyes are bolted together by a bolt 26. By removing the bolt 26, the clamping element 24 can be spread apart to release the flanges 20a—23a and 22, whereupon the socket structure can be disassembled into its component parts.

Although having substantial advantages over the structure of Fig. 1, the structure of Fig. 2 has the disadvantage that the outermost annular sealing element 19a is held in place only by engagement of its flange 23a by the clamp 24, and the sealing ring should, therefore, be constructed of some material having reasonable strength in tension.

Figure 3:
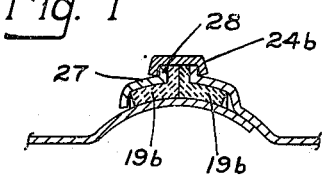
Fig. 3 is a detail longitudinal section showing a modification of the structure of Fig. 2.

If it is desired to employ the general construction shown in Fig. 2 with sealing elements of a material that is weak in tension, the structure of Fig. 2 can be modified as shown in Fig. 3, in which an auxiliary annular collar 27 having an upstanding flange 28 is employed. With this construction the clamping ring 24b wedges the collar 27 against the annular sealing element 19b positioned therebelow and exerts only compressive force against it. Except as noted, the construction in Fig. 3 is exactly the same as in Fig. 2.

Figure 4:
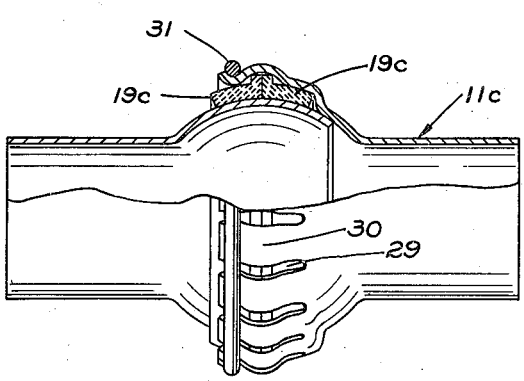
Figs. 4 and 5 are views similar to Fig. 2 showing two other modifications of the invention.

The structure shown in Fig. 4 employs annular sealing elements 19c identical with the sealing elements 19 of Fig. 1, but the socket construction is different. Thus the socket member 11c extends past the mid plane of the annular sealing elements and is contractible against the outer surface of the outer sealing member 19c.

Thus the bell end of the socket member 11c is provided with circumferentially spaced longitudinal slots 29 forming a plurality of fingers 30, the outer ends of which fingers are compressed against the outer sealing element 19c by means of a ring 31. The tips of the fingers 30 are bent outwardly to retain the ring 31 in place. In the construction of Fig. 4, the sealing members 19c have their outer surfaces directly engaged by the socket members so that they are held in compression, and materials that are weak in tension may be employed.

Figure 5:
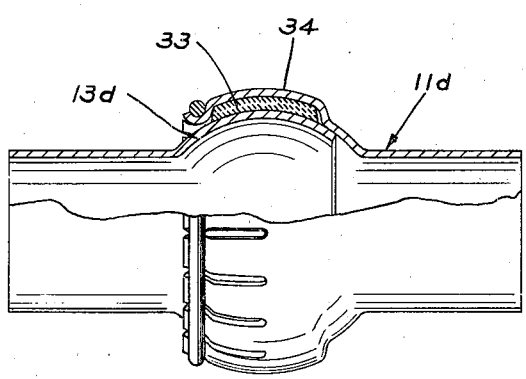

The structure of Fig. 5 is similar to that of Fig. 4 except that only a single sealing ring 33 is employed. Since the single ring has its inner spherical surface half on one side and half on the other side of an equatorial plane, it must be formed in place on the ball member 13d. This is done by forming the sealing element 33 of some plastic material such as a ceramic substance, casting it directly on the ball in a suitable mold which is removed after the ceramic material has set. The portion 34 of the socket member 11d encircling the sealing element 33 is shaped to conform to the outer surface of the sealing element and holds it in compression.

Figure 6:
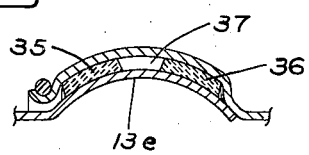
Fig. 6 is a detail longitudinal section showing a modification of the structure shown in Fig. 5.

Fig. 6 shows a modification of the structure of Fig. 5 in which two separate sealing rings 35 and 36 are employed. They may or may not have an air space 37 therebetween. If desired, they may be shaped as shown in Fig. 6 and the space 37 filled with some resilient packing material. Since the two sealing members 35 and 36 each lie completely in a zone on one side of the equatorial plane, they can be pre-formed and later assembled on the ball member 13e instead of being cast in place on the ball.

Although for the purpose of fully explaining the invention several embodiments thereof have been described in detail, various departures from the exact structure shown will be obvious to those skilled in the art, and the invention is, therefore, to be limited only to the extent set forth in the appended claim.

I claim:

In a flexible pipe joint comprising nested ball and socket members, the socket member construction comprising: a rigid annular sealing element having an inner surface of spherical curvature adapted to nest against said ball member along a zone extending on both sides of an equatorial plane of the ball member; and duct means engaging the exterior surface of said sealing element and forming fluid connection therewith; said sealing element being circumferentially continuous and consisting of two abutting sections lying on opposite sides of said equatorial plane, each section having an exterior flange at its abutting edge; and said duct having at its end an outwardly extending flange shaped and dimensioned to lie against the side of the flange on one of said sealing element sections, and means including a contractible annular channel-shaped clamping means for enclosing the three flanges and securing them together.

GEORGE W. HARVEY.

REFERENCES CITED

The following references are of record in the file of this patent:

UNITED STATES PATENTS

| Number | Name | Date |
| --- | --- | --- |
| 2,158,131 | Laurent | May 16, 1939 |
| 2,381,426 | Allen | Aug. 7, 1945 |

FOREIGN PATENTS

| Number | Country | Date |
| --- | --- | --- |
| 331,978 | Great Britain | July 17, 1930 |
| 510,417 | France | Sept. 4, 1920 |